(12) United States Patent
Pauli et al.

(10) Patent No.: US 11,157,132 B2
(45) Date of Patent: Oct. 26, 2021

(54) IMMERSIVE EXPERIENCE PASSWORD AUTHENTICATION IN EXTENDED REALITY ENVIRONMENTS

(71) Applicant: SAP SE, Walldorf (DE)

(72) Inventors: Manfred Johann Pauli, Bad Schönborn (DE); Christian Toemmel, Kaiserslautern (DE)

(73) Assignee: SAP SE, Walldorf (DE)

( * ) Notice: Subject to any disclaimer, the term of this patent is extended or adjusted under 35 U.S.C. 154(b) by 168 days.

(21) Appl. No.: 16/678,636

(22) Filed: Nov. 8, 2019

(65) Prior Publication Data

US 2021/0141880 A1 May 13, 2021

(51) Int. Cl.
*G06F 3/0481* (2013.01)
*G06F 3/0482* (2013.01)
*G06F 3/0483* (2013.01)
*G06T 19/00* (2011.01)
*G06F 3/01* (2006.01)
*G06F 3/0346* (2013.01)

(52) U.S. Cl.
CPC ........ *G06F 3/04815* (2013.01); *G06F 3/0481* (2013.01); *G06F 3/0482* (2013.01); *G06F 3/04812* (2013.01); *G06F 3/011* (2013.01); *G06F 3/017* (2013.01); *G06F 3/0346* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 10,445,523 B2* | 10/2019 | Clement | G06F 3/167 |
| 10,553,015 B2* | 2/2020 | Hemmer | G06T 15/205 |
| 2018/0024623 A1* | 1/2018 | Faaborg | G06F 3/04815 345/156 |
| 2018/0107839 A1* | 4/2018 | Clement | G06F 3/1454 |
| 2018/0286107 A1* | 10/2018 | Hemmer | H04N 19/124 |
| 2019/0236259 A1* | 8/2019 | Remillet | G06F 21/32 |
| 2019/0310759 A1* | 10/2019 | Stein | G06F 3/04845 |
| 2020/0250284 A1* | 8/2020 | Diehl | G06F 3/013 |

* cited by examiner

*Primary Examiner* — Jordany Nunez
(74) *Attorney, Agent, or Firm* — Sterne, Kessler, Goldstein & Fox P.L.L.C.

(57) ABSTRACT

Disclosed herein are system, method, and computer program product embodiments for the performing of a user authentication task in a virtual environment, for secure authentication of a user utilizing three dimensions. An embodiment operates by using a group of objects shown in a field of view to the user, wherein the user selects a subset of these group of objects by using a virtual environment device to constitute a password. Such a password, because it is chosen in three dimensions and wherein user movement in three-dimensions may be analyzed per an individual user profile according to machine learning logic, is efficient and secure.

17 Claims, 7 Drawing Sheets

IMMERSIVE EXPERIENCE PASSWORD AUTHENTICATION IN EXTENDED REALITY ENVIRONMENTS

BACKGROUND

Technology has progressed rapidly in the fields of virtual, augmented, and mixed reality. Virtual reality replaces the physical world of a user with a virtual one. Such a virtual environment may be generated through the use of peripherals such as headsets, sometimes in combination with physical spaces, or through multi-projected environments which generate realistic images. Common examples of such virtual reality devices include Facebook's Oculus, Samsung's Gear, or Google's Cardboard.

Generally, augmented reality is a live direct or indirect view of a physical real-world environment, wherein certain elements in this environment are "augmented" by computer-generated elements. In essence, augmented reality supplements one's physical surroundings with digital objects of any sort. An example of an application of augmented reality may be airline pilot helmets, wherein said helmets may display data within the pilot's view as they fly. In such cases, these helmets comprise augmented reality headsets.

Mixed reality, on the other hand, is sometimes referred to as a hybrid reality between augmented reality and virtual reality. In mixed reality, new environments and visualizations are produced, wherein physical and digital objects may co-exist and interact in real-time. In this sense, mixed reality takes place not only in the physical or virtual world, but is a mix of actual reality and virtual reality. Thus, an example of a mixed reality experience may include a flight headset, which instead of augmenting a pilot's view as they fly, may in fact simulate flying combined with the physical environment a person using the headset is located in.

Together, the three types of reality are transforming architecture, engineering, construction, software development and many other industry workflows. Many devices on the market today, from video game consoles to computer applications, flight simulators, etc. are beginning to make use of these models of virtual representation. Often, in order to do so, basic equipment such as a peripheral user headset may be used. Sensor feedback from sensors such as gyroscopes, magnetometers, and accelerometers present in such peripheral user headsets enable the feedback of a user using the headset to be utilized by a program running on the headset device, which in turn can manipulate the position of virtual objects in such an environment accordingly, in any of the three types of realities described above. For example, if the user tilts his or her head, the headset may be able to detect this tilt, the direction, and the amount the head has been displaced, in order to send this information to the program which may display objects in a virtual environment (virtual reality, augmented reality, or mixed reality) in a similarly tilted manner, to adopt to the tilt of the user.

Use of virtual adaptation in such a manner, taking advantage of the increased user participation in said virtual environments, may also be used in the field of password authentication.

For example, a static keyboard may be presented in a virtual environment, where a user may have to gaze at a key to type it (e.g. where a key may be inputted after the user gazes at it for a certain predetermined period of time) using the gyroscope, magnetometer, and/or accelerometer sensors described above, and in this manner may be able to input a password. However, the use of such keyboards in virtual environments poses several problems. One problem is complexity, in that the number of keys on a keyboard is a substantial amount, and in inputting a password using a keyboard in a virtual environment, a user may suffer from neck injury in straining to gaze at many different letters all across the keyboard (especially in the case where the password involves keys on opposite sides of the keyboard). Second, an external viewer may be able to film the actions of a first user using a virtual device (such as a headset) in inputting such a password. Then, the external viewer may try imitating the actions of the first user by mimicking the first user's gestures, and in doing so may enter the correct password without even knowing what letters the first password actually constitutes, but nevertheless being able to input these letters through the mimicking of the gestures.

This vulnerability to external viewers is a large flaw in the process of password input in a virtual environment, and casts such a virtual keyboard input method as being inherently insecure. Thirdly, such keyboards are often in a single X-Y plane relative to a user (e.g. see FIG. 1 for orientation relative to a user 102, wearing a headset 104, where a coordinate system shown in legend 108 is present). Having the keyboard in such an orientation represents a reduced level of complexity, making it even easier for an external entity filming the user per the security flaw above to imitate actions relative to a fixed plane in the Z-direction.

As opposed to the inherently insecure method presented above, certain methods purport to be more secure, but involve the use of expensive equipment, such as iris scanners. Iris scanners are not found by default on virtual reality, augmented reality, or mixed reality headsets, wherein peripherals used for such environments, such as virtual reality glasses that incorporate such scanners, require special sensors facing inwards looking at a user's eyes in order to authenticate said user.

BRIEF DESCRIPTION OF THE DRAWINGS

The accompanying drawings are incorporated herein and form a part of the specification.

In the drawings, like reference numbers generally indicate identical or similar elements. Additionally, generally, the

DETAILED DESCRIPTION

Provided herein are system, apparatus, device, method and/or computer program product embodiments, and/or combinations and sub-combinations thereof, for performing a password input task by a user through immersive experience password authentication in an extended reality environment.

Figure 1:
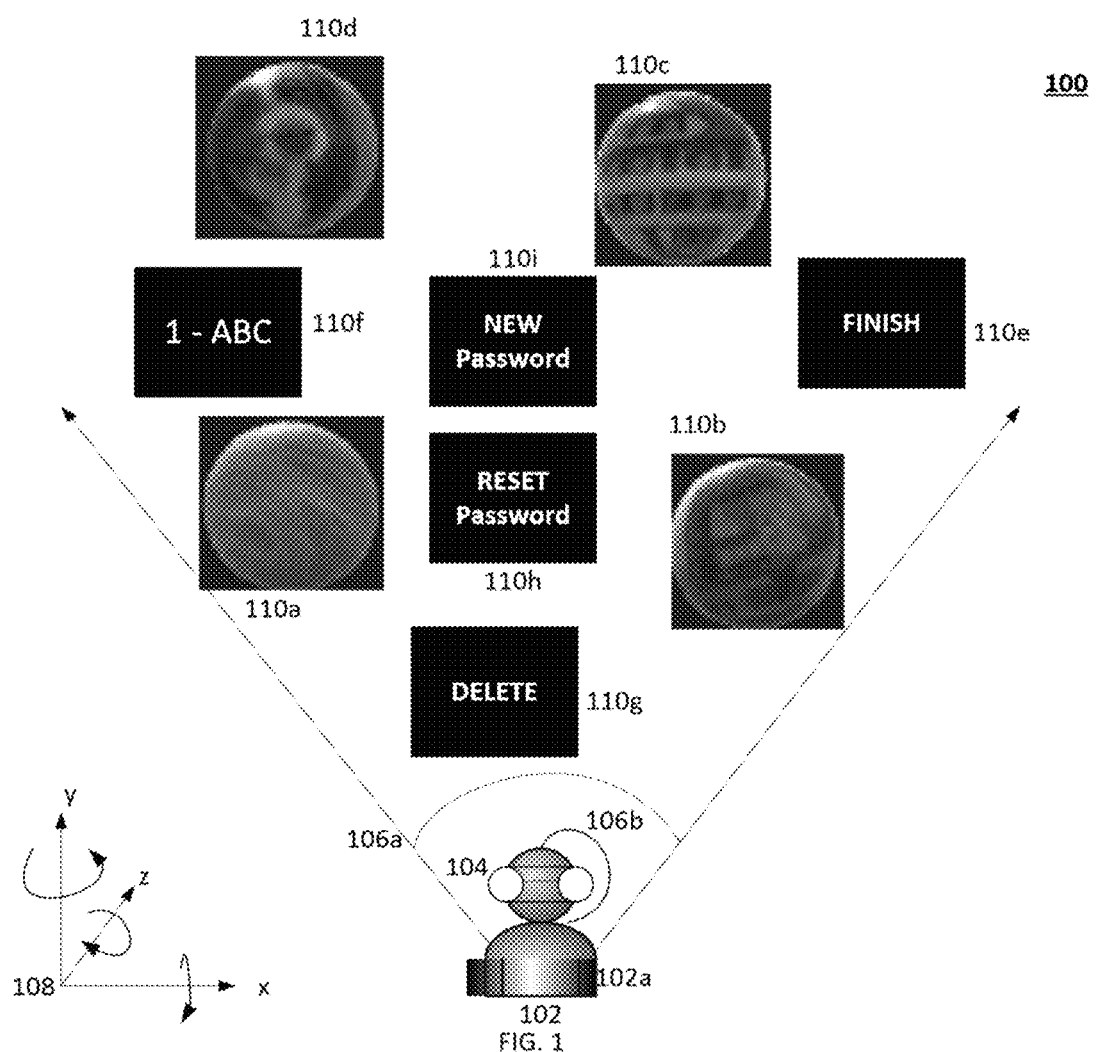
FIG. 1 is a user diagram showing the field of view of a user using the headset device and selecting floating objects to input a password, according to some embodiments.

FIG. 1 is a user diagram depicting the field of view of a user 102 using a headset 104 to look at objects 110a-110f in a virtual environment generated by the headset 104. The headset 104 may include sensors such as a gyroscope, accelerometer, and/or magnetometer. Such sensors may already be found in existing devices such as smartphones, etc, in the form of Micro-Electro-Mechanical-Systems (MEMS) type sensors, wherein these smartphones may be incorporated in existing devices such as Samsung's Gear or Google's Cardboard as mentioned above, although this disclosure is not limited to these examples. Thus, due to the proliferation of mobile devices, the present disclosure may be able to be used widely in a non-cost-prohibitive manner.

Figure 5:
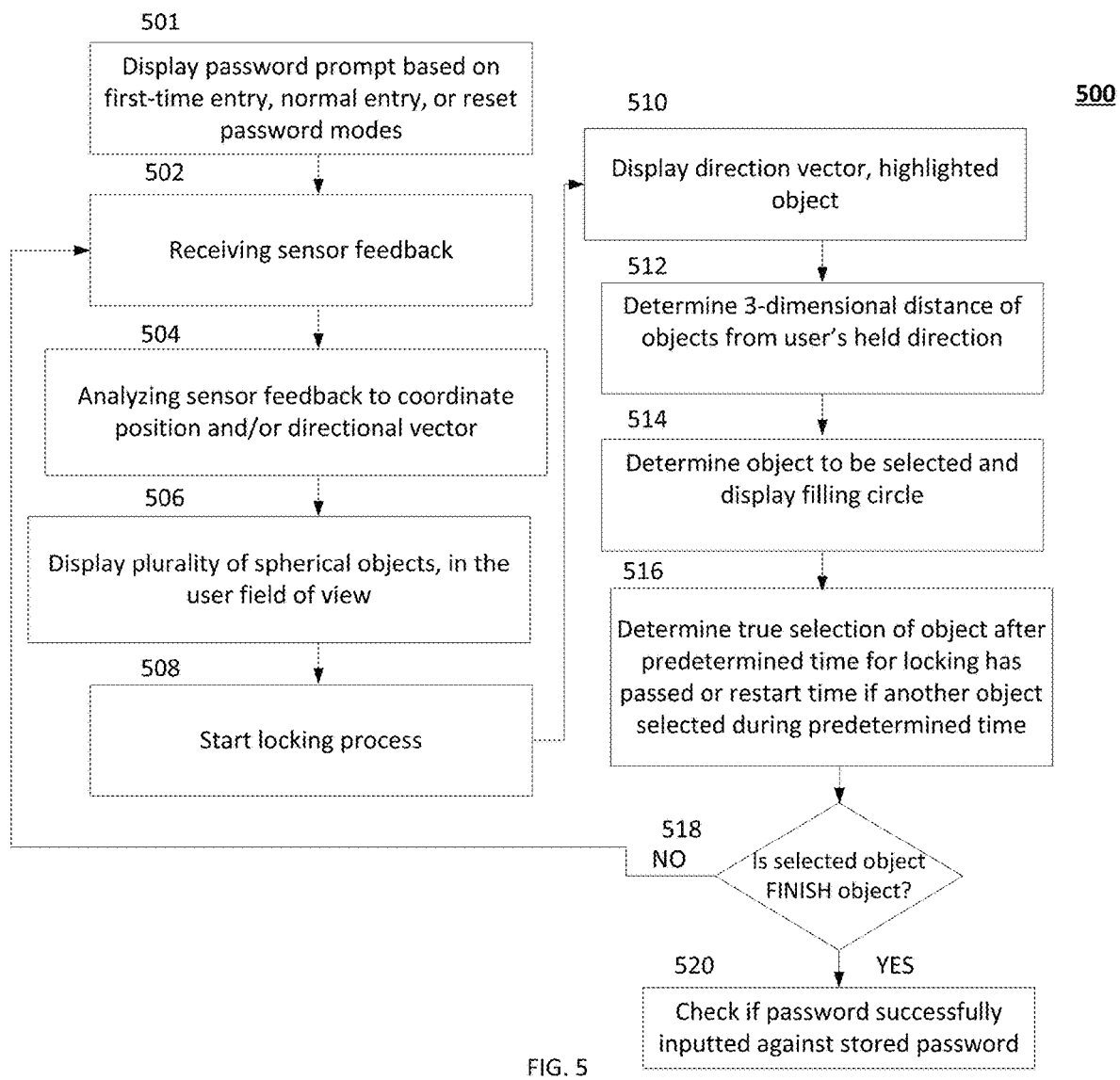
FIG. 5 is a flowchart showing the process for selection of objects by a user upon the displaying of a password prompt, as well as input of a password to be checked against a stored password, according to some embodiments.

The use of such sensors provides rich sensor input according to step 502 of the object input and password selection process 500 shown in FIG. 5, wherein the user movement may be interpreted accurately by a computer program, covering six degrees of freedom as shown in the legend 108. These six degrees of freedom are right and left (in the positive x and negative x direction respectively), forward and back (in the positive and negative z direction respectively), up and down (in the positive and negative y direction respectively), pitch around the x-axis (shown by the curved arrow about the x-axis), yaw around the y-axis (shown by the curved arrow about the y-axis), and roll around the z-axis (shown by the curved arrow about the z-axis).

The gyroscope, accelerometer, and magnetometer sensors can be used in several combinations to provide these six degrees of freedom. For example, the gyroscope may be used, in combination with the accelerometer, or in combination with the accelerometer and magnetometer to provide the six degrees of freedom. The gyroscope by itself is able to measure the sensor's angular velocity, or the rate of change of the sensor's orientation. This angular velocity indicates how fast the sensor is spinning about an axis. The three axes of rotation about which angular velocity is measured are x, y, and z, wherein said angular velocity is measured in the form of pitch, yaw, and roll. In this manner, although the gyroscope alone can provide orientation relative to the starting point of the user 102 (demarcated as the origin point) it cannot provide the original orientation of the headset, and it is also subject to a small amount of drift over time. Orientation data may be provided as rotation matrices, quaternions, or Euler angles.

The addition of the accelerometer aids in measuring acceleration in the three axial directions, x, y, and z, wherein the accelerometer measurements are complementary to the described gyroscope measurements. For example, these accelerometers may produce a voltage directly proportional to the sensed acceleration. Thus, the data provided by the gyroscope and the accelerometer combined provides data covering six degrees of freedom. Such a configuration may commonly be found in various game console peripherals such as controllers, etc.

To add even more accuracy, the gyroscope and accelerometer may be used in combination with a magnetometer. When gyroscope readings of angular velocity are integrated with accelerometer measurements, the estimated orientation may result in drift error, wherein the virtual position drifts away from the true orientation. An accelerometer can compensate for tilt drift error, however yaw drift error, or incorrect rotation about the vertical y axis, remains. In some circumstances and applications, such drift is inconsequential, because the user can be re-oriented without reference to a fixed direction. However, where orientation relative to a fixed direction is central to the application, the use of a magnetometer can help correct this error.

The magnetometer is able to measure a three dimensional magnetic field vector which is able to be used to perform yaw drift correction, resulting in a stable and accurate user experience for applications where orientation with reference to a fixed direction is important. In the present disclosure, embodiments may be presented using both configurations (with or without the magnetometer). For example, a virtual headset 104 may be used by the user 102 incorporating a gyroscope, accelerometer, and magnetometer. Alternately, a user 102 may hold a game console controller 102a in his or her hand, and such a controller may only have a gyroscope and accelerometer. Any combination or permutation of sensors between the two configurations are also possible.

An example operation of the user diagram shown in FIG. 1 will now be described by the process flowchart shown in FIG. 5. First, in step 501, a password prompt may be displayed in an application that is making use of the virtual headset 104 or the handheld peripheral device 102a. In this step, based on whether the user is entering their password for the first time, conducting a routine access of their password, or resetting their password, as may be previously chosen in the application, the prompt in step 501 may be displayed differently. For example, if the user is entering their password for the first time, the prompt may indicate to the user that they will need to choose a series of objects 110a-110i shown in their field of view, following steps 502-520, two times consecutively, to ensure security of a new password, where step 520 is not followed on the first entry, but on the second entry the second inputted password is compared and matched to the first inputted password to make sure they are the same.

On the other hand, if the user is entering their password for a routine access of their account in such an application, then the prompt in step 501 may indicate to the user they will only need to choose a series of objects 110a-110i only once, following steps 502-520 only once, where in step 520 this choice will be checked against their previously set password.

Finally, if the user has chosen to reset their password in the application, a display password prompt in step 501 may indicate to the user that they will need to choose a series of objects 110a-110i once constituting the old password (following steps 502-520 where the inputted password in 520 is checked against the user's previously set password). If the old password is accurate, then the user is given another prompt 501 to indicate to the user that they will need to choose a series of objects 110a-110i shown in their field of view, following steps 502-520, two times consecutively, to set a new password. As with the new password entry described above, this two-time entry ensures security of a new password, where step 520 is not followed on the first entry, but on the second entry the second inputted password is compared and matched to the first inputted password to make sure they are the same.

The user position relative to a starting origin in the (x,y,z) Cartesian coordinate system is first measured in step 502 by receiving raw sensor feedback. The raw sensor feedback is then analyzed in terms of the six degrees of freedom mentioned above (forward/back—z, left/right—x, up/down—y, pitch, roll, yaw), according to step 504 of the process 500. Alternative to the Cartesian coordinate system used in provided legend 108, in an embodiment spherical polar coordinates for locating objects and features with respect to the users' position may be used. In a still further alternative embodiment, cylindrical coordinates may also be used.

Based on the user position from step 504, in step 506 of the process 500 objects such as 110a-110h may be shown by a virtual program display to the user within a field of view defined by angles 106a and 106b, as shown in FIG. 1. Angle 106a may be in the x-z plane relative to the position of the user's head, if input is being detected relative to the user's head tilting, and the user is wearing headset 104 (wherein the origin lies in the center of the headset 104). Alternatively, even if the user is wearing headset 104, if input is being detected relative to a hand-held peripheral device 102a, then angle 106a may be in the x-z plane relative to the position of the user's hand-held device 102a (such as a game console controller with an accelerometer and gyroscope), where the user may be able to see the effect of the pointing through the hand-held device 102a within the virtual program display. The angles are altered accordingly, if spherical coordinates, or cylindrical coordinates, as described above, are used instead.

Although other values (lower or greater) are also possible in several embodiments, the angle 106a may, in an embodiment, be in the range of 60-120 degrees (i.e. the field may span from 0 to 30-60 degrees to the right or left of the z-axis line in the x-z plane). This is because it is easy for the user to tilt their head or point toward objects in the left-to-right direction displayed within the field of view when the field of view is restricted to such a size. Such a configuration is useful especially when two objects may be at opposite ends of the field of view and the user has to go from one side to the other, and can do so in a comfortable manner. Having the field of view within such a size enables a comfortable manner of tilting in the left-to-right direction, across the x-z plane, in this regard.

Similarly, the field of view may also have a secondary angle restriction in the y-z plane. Similar to angle 106a, angle 106b may be in the y-z plane relative to the position of the user's head, if the user is wearing headset 104 (wherein the origin lies in the center of the headset 104), or in the y-z plane relative to the position of a peripheral handheld device 102a held in the user's hand if the user is holding a hand-held peripheral device (such as a game console controller with an accelerometer and gyroscope). In this case, here too, other values (lower or greater) are also possible in several embodiments, but the angle 106b may, in an embodiment, be in the range of 60-120 degrees (i.e. the field of view may span from 0 to 30-60 degrees above or below the z-axis line in the y-z plane). This is because it is easy for the user to tilt their head or point above or below towards objects displayed within the field of view when the field of view is restricted to such a size. As with 106a, the restriction of angle 106b enables a comfortable manner of tilting/pointing, but in the up-to-down direction, across the y-z plane, in this regard.

The objects 110a-110h, shown in the form of spheres with symbol textures within the virtual program display, are shown floating in a randomized manner in their 3-dimensional coordinates (e.g, x,y,z coordinates) within the field of view, as restricted by angles 106a and 106b, to the user. Thus, the user, within a comfortable zone for tilting their head and for pointing, can tilt their head or point with their hand, and look/point respectively, at objects floating within their field of view.

In an alternative embodiment to where the type of password prompt displayed in 501 is previously chosen by the user in an application making use of the headset 104 or peripheral handheld device 102a, at step 501 it is possible for only a routine access password prompt to be displayed, wherein the user needs to follow steps 502-520 only once as described above. Then while the user is choosing objects 110a-110i, which constitute their password, a "NEW Password" object 110i and "RESET Password" object 110h may be included, wherein the user can select the input mode of inputting a new password or resetting their password within the object selection process itself. When 110i or 110h is selected by the user in this alternate embodiment, the process may go back to step 501, and the appropriate prompt (for setting a new password, or resetting a password, as described above) may be displayed to the user, with steps 502-520 to be followed as described above in the new password or resetting a password input modes.

Once the user points their headset 104 or peripheral handheld device 102a in a fixed direction, a locking process is started in step 508 of the process 500. Once the user has held their gaze with headset 104, or pointing direction with handheld device 102a, for a predetermined amount of time (anywhere in the range of milliseconds to seconds) while selecting a particular object that is shown as highlighted as described below, the object is considered locked in step 512 of the process 500. While such locking is occurring, from the time locking starts, in step 510 of the process 500 the directional vector in the (x,y,z) Cartesian coordinate system in the direction the user is tilting their head towards, or pointing their handheld device in, can be sensed through the six degrees of freedom of the detected sensor input and may be displayed within the field of view of the user, to aid them in viewing a desired portion of the field of view.

Display of the directional vector emanating from the headset 104 or peripheral handheld device 102a held by the user, towards the direction that the headset is tilted towards or the peripheral handheld device is pointing to, can aid the user in tracing the direction all the way back to the origin, and in that sense, offer better correlation of head tilt such that the direction can easily be aimed to hit an object 110 by the headset 104 or peripheral handheld device 102a.

In addition, during the locking process, at step 510, a highlight ring may be shown around an object (e.g. objects 110a-110h shown in FIG. 1) which the user is attempting to lock, wherein only one object may be locked at a time. In an embodiment, an object may be locked only when the direction in which the user is holding their gaze is within a predetermined three-dimensional distance threshold from the object, wherein said distance is determined at step 512. Alternatively, in an embodiment, during the locking process at 510, the closest object in three-dimensional space to the direction in which the user has held their gaze, determined at step 512, may be shown with a highlight ring. In either embodiment, when the user is looking in between two objects during the locking process, wherein the direction in which the user is holding their gaze is a certain three-dimensional distance from each object, which is measured at step 512, then whichever object is closest to the direction (or the object can be chosen randomly if the distance is equal) in which the user is looking, in 3-dimensional space, may be highlighted with a highlight ring or other shape, and may determined as an object which the user is attempting to select in step 514. In addition to being highlighted with a shape other designations to display selection such as making the object 110 brighter, dimmer, enlarging/shrinking, etc. can also be used.

Then, when still during the predetermined time of the locking process, if the user looks slightly towards the other object, such that the distance from the direction in which the user is holding their gaze becomes shorter to the other object than the initially highlighted object, then this other object may instead be highlighted with the locking ring, and may be determined as the object which the user is trying to select in 514, and the predetermined amount of time for locking may restart at step 516. Once the object the user is trying to select in step 514 is shown with the highlight ring for the pre-determined amount of time comprising the duration of the locking process at step 516, then that object may be considered to be truly selected.

During the locking process, in the step 514, a circular spinning wheel of a color (e.g. red, blue, or any other user-desired color) may also appear on the virtual program display once an object the user is trying to select is determined in step 514, by the user's pointing of the headset 104 or their pointing of the peripheral device 102*a*. This circular spinning wheel may be displayed by the virtual program display in the field of view, to visually indicate to the user 102 the object that is being locked. In this way, the user has a better idea of where they are looking within the virtual program display environment, as well as which object they are locking, and they can easily aim the direction they are looking in towards an object 110*a*-110*f* to be locked as they wish.

The wheel may first appear with no fill color. When the user stops moving their headset 104 or pointing device 102*a* to hold their gaze or pointer direction for a predetermined amount of time (the program considers a stop in movement to be no or little movement in the (x,y,z) coordinate system, below a threshold distance in 3D space), the wheel may gradually fill with color (on the scale of milliseconds to seconds commensurate with the locking time described above), and once it is completely filled this may indicate that the direction is considered locked. As described above, if the object being locked is not desired, while the circular spinning wheel is filling at step 514, if the user looks in another direction, at step 516 the predetermined duration of the locking process is restarted.

Once an object is truly selected in step 516, the program may show a status such as "Selected" on the virtual program display, to indicate to the user 102 that an object has been selected, and may store such a user selection in primary or secondary memory 708 or 710 explained below.

In this manner, the user 102 in FIG. 1 can truly select numerous objects and select these objects in a sequence. In particular, such a sequence of selection of objects can collectively constitute a password selection. To finish their input, one of the objects 110*e* may be a terminal object with "Finish" written as shown in FIG. 1. The program may follow the decision logic in step 518, wherein if the object selected is not the terminal object ("NO" at step 518) then the program returns to step 502 for the possible selection of other objects. If the user selects a series of objects such as 110*a*-110*f* in a sequence and then does select the terminal object ("YES" at step 518), then at step 520, a password input in the form of the series of objects 110*a*-110*f*, in the order selected, may be submitted as a password by the program to be checked against a stored password, and either permit/deny to the user further actions based on said checking assessment.

When a new password is selected, the steps 502-520 are repeated twice as described above with regards to step 501, wherein 520 is not checked the first time the password is inputted, but the second time the password is inputted, the second input of the password is checked against the first input of the password to see if both inputs match. Similarly, when a password is reset, step 520 on the first run through of steps 502-520 compares the inputted password against the old, previously set, password of the user. Then the user repeats steps 502-520 again two more times to input a new password, where 520 is not checked the first of these two more times, but is checked the last of the two more times to make sure for both of the two more times the password that was input was the same. When a new password is successfully set, or a password is successfully reset, status updates such as "New password successfully set" or "Password successfully reset" may be shown on the virtual program display in FIG. 1, to let the user know their password has been set or reset successfully. On the contrary, if the new password or reset password has not been successfully set or reset, a further prompt 501 asking the user to re-input password selections for setting a new password or resetting a password may be shown.

Figure 2:
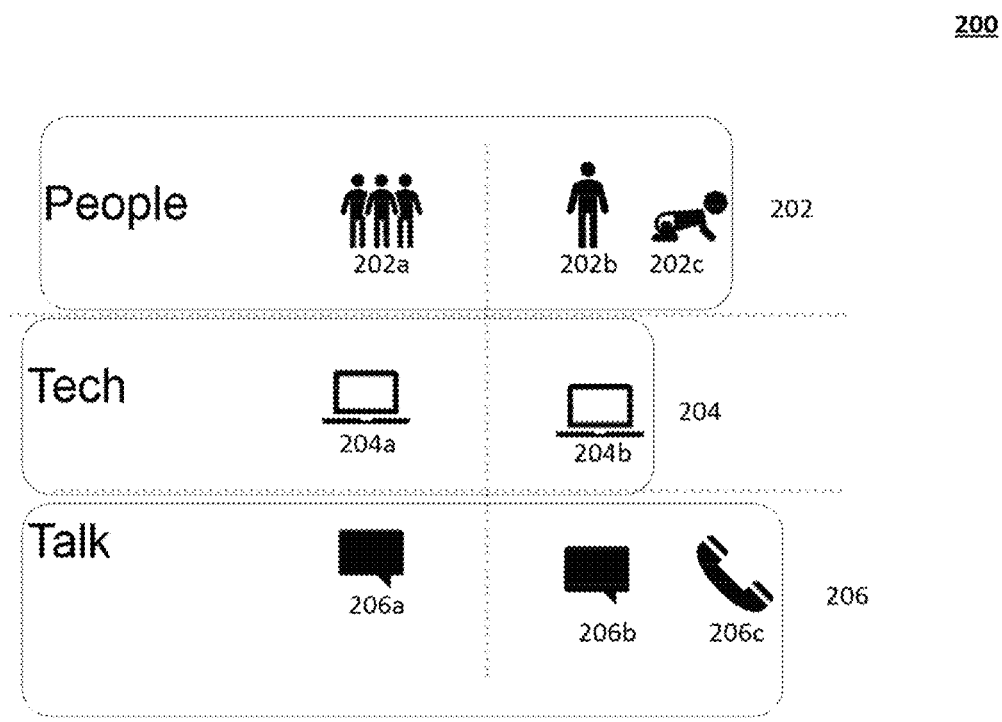
FIG. 2 is a block diagram showing example types of categories and combinations of icons within the categories that might be used in the creation of passwords, according to some embodiments.

In this manner, there are different types of passwords that are possible for input. There may be a plurality of objects 110 present of the type 110*a*-110*d* in the field of view of the user. For example, although 110*d* shows a dog in FIG. 1, other types of animals may also be used for objects 110 floating in the field of view of the user 102. Other types of objects, such as the ocean shown in 110*a*, or building facades used in 110*b*-110*c* might also be used, as shown in FIG. 1. Alternatively, other types of objects 110 are also envisioned. For example, as shown in FIG. 2, several different categories of objects 110, such as People 202, Tech 204, and Talk 206 are envisioned, with logos such as those shown in 202*a*-202*c*, 204*a*-204*b*, and 206*a*-206*c*, respectively. The logos present in FIG. 2 for example, can be used collectively to constitute a password. Aside from selecting objects such as 110*a*-110*f* for their password, there are also objects such as 110*g*-110*i* which can be selected for the user for modifying their password entry. For example, the delete object 110*g* can have the function of deleting the last object selected by the user, when it is selected.

Figure 3:
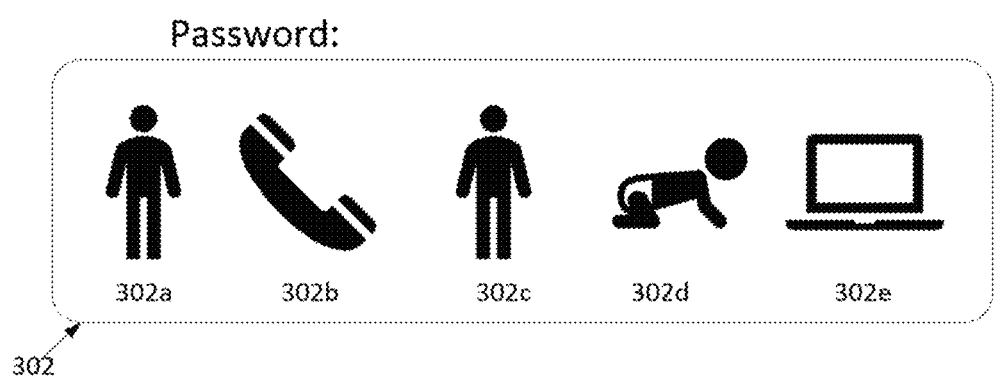
FIG. 3 is an example of a type of password made in combination with different categories, according to some embodiments.

An example of such a password, password 302, is shown in FIG. 3. Such a password may actually be of a story expressed by the choice and sequence of the virtual symbols to form a password that is memorably to the user. The example of password 302 shown in FIG. 3, may represent a password story for the user, for example: "My boyfriend (represented by human object 302*a*) was talking (represented by telephone object 302*b*) to a friend (represented by human object 302*c*) of his. He told me about his baby (where the baby of the human object 302*a* is represented by object 302*d*) and wanted me to repair his computer (represented by computer object 302*e*). In this manner, a relatively simple life story can be used as a password, wherein there is a clear sequence and chronology of elements used in the story, and each part of the story is represented by a different element in the form of object 110 (wherein the objects 110 are 302*a*-302*e* in the password 302 of FIG. 3). Because the user may choose a password that they have lived through, or is memorable to them, it will be easier for them to remember, both in terms of what elements are being used, and the sequence or chronology in which they appear, and thus is a more effective password than one they may easily forget.

Such objects 110 may also be letters floating in the field of view of the user 102. As an example, such objects 110 may also comprise hybrid number letter boxes, which may be inside of a spherical shape like the other objects 110a-110d, or any alternate shape such as a prism, cone, tetrahedron, or any three-dimensional polygon, with text such as that shown in 110f (e.g. the text "1-ABC"). These types of hybrid number letter boxes may represent a dual functionality, wherein when a user gazes and selects such an object such as 110f, upon having selected such a box, for a predetermined amount of time it may split into 4 boxes or sub-objects according to its components, one for "1," one for "A," one for "B," and one for "C." Then, for the predetermined amount of time (on the scale of seconds or half seconds or quarter seconds, in respective exemplary embodiments, to allow the user time for further selection), the user may further select within 110f what option they would like to choose, either "1", "A", "B", or "C." Within the further selection time, the time taken for the user to lock in the further choice of "1", "A", "B", or "C" would be commensurate with the locking time described above. With such a dual functionality, the user without needing to strain their neck with the headset 104 or without needing to point in multiple places can choose between 4 options at once. This is highly efficient from an input point of view. Since gazing speed is much less for a user than typing speed, wherein it is known the average person types 38 to 40 words per minute, or 190 to 200 characters per minute, this can help a user make an input more quickly.

In an embodiment, for password input, objects 110 such as hybrid number letter boxes as 110f could be repeated for the rest of the alphabet from A to Z. As a result with 3 letters each, only 8-9 such objects 110 floating across the screen in a randomized manner would be needed to cover the entire alphabet. Letting alphanumerical characters, one per object 110, float in the field of view of the user 102 would severely clutter the field of view, look aesthetically unpleasing, confuse the user, and/or may delay the user significantly each time they would need to enter a password. Instead, by grouping alphabets together in this manner, in this way, the user, in a virtual reality, mixed reality, or augmented reality, using a headset 104 or handheld peripheral device 102a would be able to easily input any password that a user on a computer would be able to input. This may be particularly helpful if the headset is being used in connection with a computer program, where for example a user in an operating system running in a virtual reality environment or mode may use such a password input for authentication. Alternatively, an operating system running independently in a normal mode of operation may use the virtual reality password input as an added layer of security. Once a successful password has been inputted according to the authentication method embodiments of this disclosure, a program or operating system may display a message of successful password input to the user on the virtual program display, and may continue running processes or tasks which require such authentication. Particular arrangements of such programs will be described below.

As described, objects 110 may be displayed in a randomized floating manner across the field of view of the user 102, wherein the field of view is defined by the zone within angles 106a in the x-z plane and 106b in the y-z plane relative to the user 102. By floating, this means a gradual movement of the object (e.g. objects 110a-110f shown in FIG. 1) at a constant velocity or slight acceleration in Cartesian (x,y,z) three-dimensional space (or spherical/cylindrical coordinates, per the alternate embodiments mentioned above). Because the field of view is bounded within angles 106a and 106b, when the object 110 reaches a boundary of the field of view it may treat such a boundary as a wall, and bounce off of said boundary, such that it continues its trajectory within the field of view relative to the user 102.

In addition to moving in a randomized floating manner, objects 110 may also move across the field of view of the user in other manners in alternative embodiments. For example, in an embodiment, instead of moving gradually, the objects may be chosen to be displayed randomly in different locations within the field of view of the user 102, bounded by angles 106a, 106b, at predetermined time intervals. For example, every 5-15 seconds, the locations of each object 110 within the field of view of the user 102 may change to a new location at random bounded within the field of view. Such an embodiment may be useful where there are a substantial number of objects 110 within the field of view of the user 102, and thus elements that are on the outer edges of the field of view may be displayed in a more accessible manner more quickly, whereas with the gradual movement embodiment it would take them more time to come to the center of the field of view (as they are moving at a certain velocity/acceleration as opposed to being randomly shifted). The objects 110 on the outer edges would be displayed in a more accessible manner more quickly because upon shifting to a new random location that would not be on the outer edges of the field of view, of which the chances are high since a position is chosen at random within the field of view, the objects 110 would be more easily accessible to the user (i.e. the user would not have to strain his head or pointing hand to an outer edge of the field of view to access or select the object with the locking process described above).

With the provision of multiple groups of symbols included in possible objects 110 that can be displayed to the user 102 in their field of view, the possibility of creating many such stories as the one shown in FIG. 3 exists. Any number of objects may be chosen to be displayed within the field of view of the user 102 that the user may select. Further, the user may be asked to select any number of objects 110 out of the number of objects that are displayed in their field of view. In this manner, in an embodiment, if 15 objects 110 are picked at random from groups such as 202a, 204a, 206a, or other groups such as animals (which may include elements such as object 110d in FIG. 1) or buildings (which may include elements such as objects 110c/110b in FIG. 1), and the user is required to pick even 5 different elements for a password, there is the possibility of many different element combinations, such that it may be easy for the user to choose a story from their memory that may map in terms of elements and chronology to objects floating in front of them.

Further, it is possible in an embodiment to pick the same number of objects 110 randomly from several groups (e.g. 3 from each of the 5 groups in the Example above). Alternatively, in another embodiment, based on user preference, where for example the user may have more memories associated with and may prefer a password based on one group (e.g. animals), more of the objects may be chosen from that group and less objects can be chosen from the other groups (e.g. 10 objects from the animals group, 2 objects from the buildings group, and one each from the groups 202a, 204a, and 206a).

Furthermore, once a user picks a password, it is relatively safe and secure. Proceeding along with the embodiment above involving 15 objects 110 picked at random, where the user may be required to pick 5 different elements for a password, if objects 110 can be reused for each element, then there is a possibility of 759375 different combinations. The safety aspect may stem from a vast number of sufficient different combinations as well as the fact that the selection process may take place on a scale of quarter seconds, half seconds, or seconds. This is because this time period (a predetermined number of quarter seconds, half seconds, or seconds) becomes the minimum time needed to select an element. In that case, with this limiting time scale for selection, a computer cannot take advantage of its faster processing speed for selection, and still has to position a headset 104 or peripheral pointing device 102*a* for a predetermined selection period according to the locking process above.

Another important aspect is the flexibility with which objects 110 may be displayed at different times. For example, a user may have object 302*a* in FIG. 3 displayed on his left side one time he is entering his password. Displaying object 302*a* towards the left will cause the user to pan device 102 or 104 towards the left. However, the next time the user logs in, the system 100 may display object 302*a* on the right side causing the user to pan device 102 or 104 towards the right. In both instances, the passwords are identical and therefore begin with the selection of object 302*a* first, but the user's head, neck and eye movements are different for each instance of password entry depending on the placement of the objects 110 in the virtual space. This system and method are more secure than using a physical keyboard to enter passwords where hand and finger movements to enter passwords are the same each time as the positions of the keys on the keyboard do not change with each password entry.

Even if a robot were to try and point every single combination possible, in an effort to exploit the password, in the case where the selection time is on the scale of seconds (e.g. 1 second per selection), it would take such a robot 210.94 hours, or approximately almost 9 full days to go through all such combinations. By this time, it would be sufficiently easy for an IT monitoring operation, or security monitoring apparatus, to pick up on such intruding activities.

Furthermore, the number of elements the user is asked to pick out of the total number of objects 110 displayed in their field of view may vary depending on the time scale. For example, on the scale of quarter seconds for selection time, with the above example of picking 5 elements out of 15 displayed in the user's (102) field of view, in contrast to the example above with selection on the scale of seconds, it would take a robot about 52.73 hours, or approximately 2 days. In order to make it even more difficult for the password to be cracked, the user may simply require the selection of 6 elements out of the 15. In this case, it would take a robot about 791 hours, or approximately 32 days, to try every single combination of passwords possible, to crack the password. Again, in this case, by this time, it would be sufficiently easy for an IT monitoring operation, or security monitoring apparatus, to pick up on such intruding activities. In this manner, the number of elements required to be picked by the user to constitute a password, as well as total number of objects to be displayed in the field of view of a user 102 may be varied.

When choosing the total number of objects 110 to be displayed in the field of view of the user 102, and the number of such total number the user 102 must pick to comprise a password, several considerations must be taken into account. Such considerations may include not cluttering the field of view by displaying too many total objects and making it difficult for user selection to take place, but at the same time providing enough total objects that a password can be chosen that is not easily crackable. Such considerations can also include not requiring so many elements for a password that the user is not able to easily remember a story or personal memory corresponding to such a password but requiring enough elements such that a password is secure against hacking attempts. Finally, such considerations may also include not requiring so many elements that it is overly burdensome and takes a long time for the user to input the password but again requiring enough elements such that a password is secure against hacking attempts.

A program running on the headset 104, or incorporating feedback from the peripheral handheld device 102*a*, the output of which may be shown on a virtual program display, may also incorporate machine learning logic for added customization or security features. The system arrangement is shown in an embodiment with reference to FIG. 4. The headset 104 or peripheral handheld device 102*a*, as shown in FIG. 1, may be the user accessory 402 shown in FIG. 4. The program running on the headset 104 or incorporating feedback from the peripheral handheld device 102*a*, as described above, may be running on the user module 404.

The headset itself may comprise a computer system 700, as will be explained below, and in this case the headset itself may be the user module 404 in FIG. 4. In an alternative embodiment, the headset may be linked to a separate computer comprising computing system 700, and may only comprise equipment needed by a user for viewing and feedback such as a display and sensors (gyroscope, accelerometer, and/or magnetometer in any combination) for feedback to the separate computing system. For example, an operating system may be running a game on computing system 700 through a GPU 704, wherein the headset may provide viewing and feedback through a display and sensors. Other applications may include web browsing in a virtual environment in an operating system, or any other such application where a virtual reality environment may be generated by a computer system 700, wherein such an environment may be displayed on and receive feedback from a headset 104 or peripheral handheld device 102. In this alternative embodiment, the separate computer comprising computing system 700 is the user module 404. In a still further embodiment, the headset may only comprise equipment needed by a user for feedback (gyroscope, accelerometer, and/or magnetometer in any combination), and may be linked to a separate computer comprising computing system 700, and its own linked display for showing output to the user 102 (that is, only sensory feedback is received from the headset).

Similarly, in the case of the peripheral handheld device 102*a* as the user accessory 402, the handheld device 102*a* comprises equipment needed by a user for feedback (gyroscope, accelerometer, and/or magnetometer in any combination). In this case, the user module 404 may be a headset 104 used in tandem with the peripheral handheld device 102*a* that comprises a computing system 700, or alternatively it may be a separate computer with a separate display that comprises computing system 700.

In describing the machine learning logic used, firstly, the raw sensor feedback data detected from the user accessory 402 (from the gyroscope, accelerometer, and/or magnetometer of the user accessory 402) may be detected, analyzed, and translated into vector measurements involving the six degrees of freedom, such that coordinates relative to the origin in Cartesian (x,y,z) 3-D space can be determined. These measurements can then be sent by the user module 404 to the central module 406 for storage in a database in central repository 406*a*.

Alternately, instead of being read by the user module 404, the sensor data may be read simultaneously from the user accessory 402 by the user module 404 and the central module 406. The sensor feedback data may be detected, analyzed, and translated into vector measurements involving the six degrees of freedom independently by the central module 406, stored in a database in central repository 406a. The central module 406 may be part of a cloud computing environment 602, explained below, wherein an application generated from such an environment 602 may be run on the user module 404, which is connected to the cloud computing environment 602 through the internet or an intranet. In this manner, the power of several computing resources in the cloud computing environment 602 may be used for faster processing, the output of which may be shown on a display by the user module 404 to the user 102.

The data that is stored by the central repository in at least one database, according to the embodiments heretofore described, may be analyzed using machine learning logic by the central module 406. For example, a Bayesian learning, neural network, or Apriori based Probability Tree Classifier (APTC) mode of learning may be used to predict movement patterns for individual users of the user accessory 402.

First the APTC mode of learning will be described. A portion of the stored trajectory data based on sensor feedback measured during a user session from the user accessory 402, which is stored in a database in central repository 406a, may be utilized as training data. The data taken from the sensors may also be associated with a particular time by the user module 404 or central module 406, when the data is read from the sensors from user accessory 402. This way spatial and temporal analysis may be conducted in the training process, and may be used to construct a probability tree. The steps for the APTC mode of learning, in chronological order, may be as follows:
  a. Spatial and temporal collection through the sensors of the user accessory 402
  b. Compilation of training sets by the user module 404 or central module 406, with time stamps associated with each reading of the sensors
  c. Data pre-processing-cleaning, integration, reduction, transformation
  d. Forming of association rules between data and probabilities using apriori algorithm
  e. Construction of the probability tree
  f. Predicting the next location with the current trajectory The next location that a user will move his/her headset 104 or handheld peripheral device 102a may be predicted by finding matches between a person's current trajectories with the probability tree. For step d, the forming of association rules may mean finding locations that are visited together more frequently. For example, if a user 102 often visits one area for selection, and typically selects another object adjacent to said area, within his or her field of view, then an association rule might be formed. In response, things might be altered in such a way that it matches the frequently visited locations.

In constructing the probability tree, for step e, the entire field of view (bounded by angles 106a, and 106b, and which may be further bounded in the z-depth direction depending on a suitable display per user preference by the program) of the user in 3-D space may be split up into a plurality of zones and sub-zones within the zones. First, in accordance with a user's pattern of behavior, a probability value for each location may be initialized. For each zone, the probability that it was the first visited location in a movement sequence by the user 102 may be calculated. The probability for every node may be updated, based on the probability that it was the first visited location in a movement sequence by the user 102. In this manner, in a continuously updated fashion, the zone with the highest probability of visiting next can be determined.

Furthermore, abnormal movements may be detected through certain detection mechanisms. As per step f of the procedure for the APTC mode of learning, given a current trajectory the next sequence of location may be predicted, based on human movement data. In contrast, if probabilities start to change at a more rapid rate, the algorithm may determine that instead of a human, which has to gradually strain their neck and move their neck through 3-D space to move the headset 104 between different objects 110 in 3-D space, a robot may be trying to use the virtual reality headset. In case this is not desired (e.g., to deter intrusion and/or hacking attempts), then the program may be able to detect this through the rapid changes in the probability tree, via the APTC mode of learning, and provide an output to the user either shutting down the program, or preventing authentication.

Further, if a different user starts to use the user accessory 402 in the middle of a session (through hacking, the original user forgetting to log off, or any other possible scenario), this difference in movement according to the new user may also be detected through the APTC mode of learning. In this case, in comparison to the training data, which is for the user profile of the original user, movements of the different user will be beyond a certain probability prediction based on the training data for the original user. Once a continuous pattern of difference in predicted movements and actual movements is shown to be beyond a certain error bound threshold of distance in 3-D space, confirmed by a 1-sample, 2-sample, or paired t-test or p-test to confirm statistical significance, then the program may produce output immediately logging the new user out of the original user profile.

Alternative to the APTC mode of learning, a Bayes learning model may be used. In Bayesian network modeling, as with the APTC mode of learning, the field of view may of the user 102 may be broken up into numerous zones, for the estimation of posterior distribution based on training data compiled from sensor measurements.

In the Bayesian model, as well as in the APTC mode of learning, a zone-by-zone approach may be taken. In this approach, the field of view may be broken into many such zones, such that from any zone the proximate vicinity of 3-D space in which the user 102 is pointing the headset 104 or peripheral handset device 102a can be determined.

According to the Bayes theorem:

$$P(X \mid Z) = \frac{P(Z \mid X)P(X)}{P(Z)} \qquad \text{Equation 1}$$

In the above equation, P(X|Z) may represent the probability of the user accessory 402 moving from a previous zone to a new zone X after a predetermined time interval, given features Z associated with the data. The measure P(X|Z) is simultaneously computed for all zones X in the field of view other than the previous zone, and the zone for which P(X|Z) is the highest may indicate to the program that the headset 104 or handheld peripheral device 102a will move to such a zone next. Features Z may include the zone from which the user is moving their head, the time of the day, wherein the time of the day may be recorded by the user module 404 or central module 406 when reading data from the sensors as described above, and optionally the noise level. Because the noise level may affect the user's (102)

concentration level, and hence speed at which he or she moves his or her head, in an embodiment the headset 104 or peripheral hand device 102*a* may also include a decibel meter for sensor feedback, from which such data may be associated with the data from the other sensors and time of day.

Although P(X|Z) is not known, P(Z|X)P(X), as well as P(Z), may be determined from the training dataset. The training dataset may be formed by observing the user's head or hand movement for headset 104 or peripheral handheld device, respectively over an extended period of time (e.g., on the scale of blocks of 5-10 hours, or 1-2 days, etc.). In this period of time, from every zone within the field of view of the user 102 (which every such zone may be designated as a first zone), data associated with the probability of movement from the first zone to every other zone in the field of view of the user 102 may be recorded. This movement may also be recorded with regard to the time or decibel level at which such movement takes place, and the probability of such a movement with a particular range of decibel level or particular time of day may be recorded. The model assumes that all features are independent (i.e. $P(Z_1,Z_2|X)=P(Z_1|X)P(Z_2|X)$).

Then, utilizing such training data, P(Z|X)P(X) and P(Z) may be set, and used to find P(X|Z) for actual (test) data. For a zone X, P(X) represents the probability of movement of the user's headset 104, or the handheld peripheral device 102*a*, from the previously recorded zone to the zone X, as opposed to any other zone. Within P(X) there may also be P(Z|X), representing how often the features Z (e.g. morning/afternoon/evening time, low-noise/medium-noise/high-noise environment, etc.) occur given that the user's headset 104 or handheld peripheral device 102*a* is moving to zone X. Finally, P(Z) may accumulate over all P(X) for the movement of the user's headset 104, or the handheld peripheral device 102*a*, to all zones from the previously recorded zone, under conditions of features Z.

Additional features Z may also be contemplated such as user age, location, climate, etc, in additional embodiments. These additional features may either be recorded by the user module 404 or central module 406, or may be read directly from the user accessory 402 based on additional sensors included in the user accessory 402 (such as GPS sensor, thermometer, humidity sensor, moisture sensor, and the like). In addition, such training data may be compared to the test data, re-measured, and monitored over periodic intervals by the central module 406 to adjust for long-term changes in the user's movement behavior, and associate such changes with their individual user profile.

Given the zone-by-zone approach, and the setting of training data for individual users as described above, several different security features may be implemented by a program running on user module 404 or central module 406. In particular, from a previously recorded zone where the user accessory 402 is moving from, there may a first layer of immediately adjacent zones to said previously recorded zone. Then, there may be a second layer of adjacent zones which are immediately adjacent to the zones in the first layer, and so on. If the zones are small enough, human and computer movement may be distinguished with regards to P(X|Z) or using the APTC approach described above, wherein for a human, the probability of movement to immediately adjacent zones would be higher than that of a computer, which would likely move at a much faster rate between zones and thus have a higher probability of moving from a previous zone to perhaps a third or fourth layer of adjacent zones in the same time interval that a human user would move the user accessory 402 to the first layer of immediately adjacent zones. In this manner, human and computer activity can be distinguished, and a program running on the user module 404 and central module 406 may go into a lock down mode or log the user off, when control of the user accessory 402 by a robot is detected. In this embodiment, care must also be taken however to not make the zones overly small, wherein beyond a certain point probability cannot be reasonably predicted even in the immediately adjacent zones.

Using a similar approach for P(X|Z) under the Bayesian learning model or the probability tree with the APTC approach described above, there may be an embodiment where when a different user hacks into or takes control of an original user's use-session, an irregular behavior pattern, not conforming to the movement probability or patterns of the original user, may be detected. The irregular detection would be based on zones in a similar manner to the zone-by-zone approach described above, where different user's may move at different speeds into different areas at different probabilities. Additionally, user's performances may be feature dependent, wherein at night certain users are more energetic and move much faster, wherein certain user's cannot concentrate in a loud environment and move slower, etc. The aim with the multi-tier feature and zonal analysis is to conform the movement of each user safely to his or her unique individual profile, where when another user would be using the use-session, movement would consistently not conform to the probabilities associated with the original user profile, and using a 1-sample, 2-sample, or paired t-test or p-test, a significant difference may be confirmed, and such a new user may be automatically logged off of the original user's use-session.

The application of the password authentication system, combined with the machine learning logic described above for enhanced security, may be used for numerous programs and applications. For example, in the case where the user accessory 402 also comprises the user module 404 and has its own computing system, it may be able to run an operating system within the glasses itself. Alternatively, the user accessory 402 may be separately connected to a user module 404, which may comprise a computing system running an operating system. In either case, such an operating system which may require authentication at several junctures such as logging on, logging off for particular users. In this case, the password authentication method described above may be used. Utilization in such a manner is considered safer than current methods such as typing the password on a physical or virtual keyboard, because as described above the method of this disclosure involves the randomization of objects in 3D space which the user must navigate in order to select the elements constituting the password. Additional use-cases may include programs within the operating system. Another area of application may be not restricted to a singular computing system, but may be for web-applications, wherein the web-application, for authentication, may require a user accessory 402 to be connected to a computing system such as the user module 404, and select a password in 3-D space as described above. This is more secure than current methods of web-application authentication and to make sure the user is not a human, as current methods often involve 2-D selection, not 3-D selection, and furthermore not in the manner described above. Further use cases may include user authentication for video game consoles, wherein user module 404 is a video game console, and the like.

Figure 7:
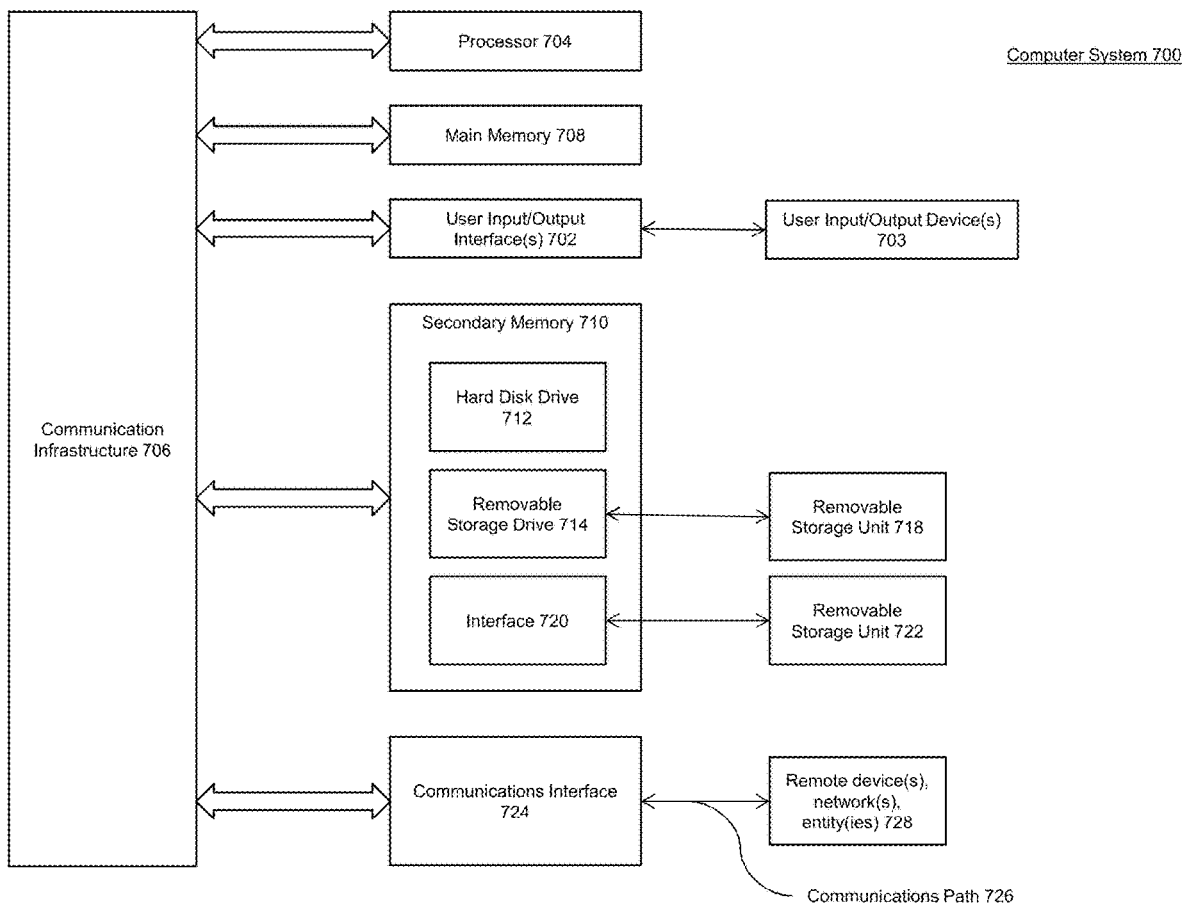
FIG. 7 is an example computer system useful for implementing various embodiments, according to some embodiments.

The underlying structure of a computer system 700, shown in FIG. 7, can implement the user module 404, the central module 406, a database included in the central repository 406a as part of the central module, and the sending and receiving of data. Such a computer system 700 may be included as part of any combination of the user module 404, central repository 406a, and/or central module 406 (e.g. a singular computer system 700 may be included jointly by the user module 404, central module 406, and central repository 406a, or each module/repository could include a separate computer system 700—the configuration in an embodiment is wherein the user module 404 includes a single computer system 700, and the central module 406 includes a single computer system 700 implementing the central repository 406a). Computer system 700 may include one or more processors (also called central processing units, or CPUs), such as a processor 704. Processor 704 may be connected to a communication infrastructure or bus 706.

Computer system 700 may be virtualized (such as in the case where the user accessory 402 also includes the user module 404, wherein the headset 104 may include an in-built computing system 700), or it may also include user input/output devices 703, such as monitors, keyboards, pointing devices, etc. including user accessory 402, which may communicate with communication infrastructure 706 through user input/output interface(s) 702.

One or more processors 704 may be a graphics processing unit (GPU). In an embodiment, a GPU may be a processor that is a specialized electronic circuit designed to process data received from the central repository 406a for analysis according to the machine learning algorithms described above in a mass quantity for large amounts of features Z or periods of training data, making it particularly effective in resource-intensive applications. A data provisioning agent controller may be used for resource partitioning among GPU's 704 of several computing resources 610 of the cloud computing environment 602 of FIG. 5 including computing systems 700. The GPU may have a parallel structure that is efficient for parallel processing of large blocks of data, such as mathematically intensive data including APTC or Bayesian learning-type calculations which can include table data received from central repository 406a as described above.

Computer system 700 can also include a main or primary memory 708, such as random-access memory (RAM). Main memory 708 can include one or more levels of cache (including secondary cache).

Computer system 700 can also include one or more secondary storage devices or memory 710. Secondary memory 710 may include, for example, a hard disk drive 712 and/or a removable storage device or drive 714, which may interact with a Raid array 616, which may combine multiple physical hard disk drive components (such as SSD or SATA-based disk drives) into one or more logical units, or a removable storage unit 718. Removable storage unit 718 may include a computer usable or readable storage device having stored thereon computer software (control logic) and/or data, including remotely accessed network drives. Removable storage unit 718 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote entities 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Figure 4:
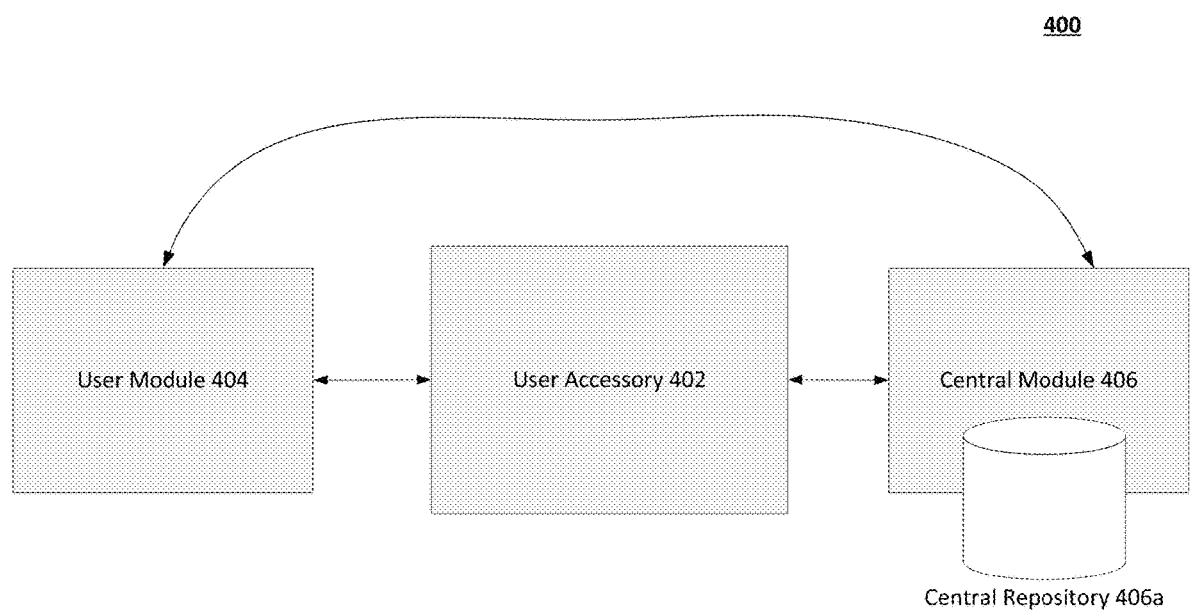
FIG. 4 is a block diagram of an example system arrangement that includes a user accessory, user module, central module, and central repository, according to some embodiments.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination, and may be used for sending or receiving data (e.g. between any of the user accessory 402, the user module 404, the central repository 406a, and the central module 406 in FIG. 4). Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Computer system 700 may be a client or server, accessing or hosting any applications and/or data through any delivery paradigm, including but not limited to remote or distributed cloud computing solutions such as cloud computing environment 602 which will be explained infra; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

In implementing the central repository 406a, as an example approach, for storing and accessing its constituent data objects, the computer system 700 may use an in-memory database with persistence, which may store and access data objects from the primary memory 708 of the computer system 700 with a transaction log for persistence being stored in secondary memory 710. Alternately, the computer system 700 may use secondary memory 710 entirely to store the repository, or may implement a more frequently accessed portion of the data objects in an in the primary memory 708, and a less frequently accessed portion of the data objects in secondary memory 710.

If the central module 406 is present along with central repository 406a jointly in a computer system 700, then the computer system 700 may implement the database using the communication infrastructure 706 for communication between central repository 406a and the central module 406, but may send data to the user module 404 through the communications interface 724, through communications path 726, where central module 102 is a network entity 728. An analogous mode of operation may apply if the user module 404, central module 406, and central repository 406a are all jointly present in a computer system 700, for using the communication infrastructure 706 for communication between the user module 404, central module 406, and central repository 406a, but the communications interface 623 for sending data to external network entities 728.

Figure 6:
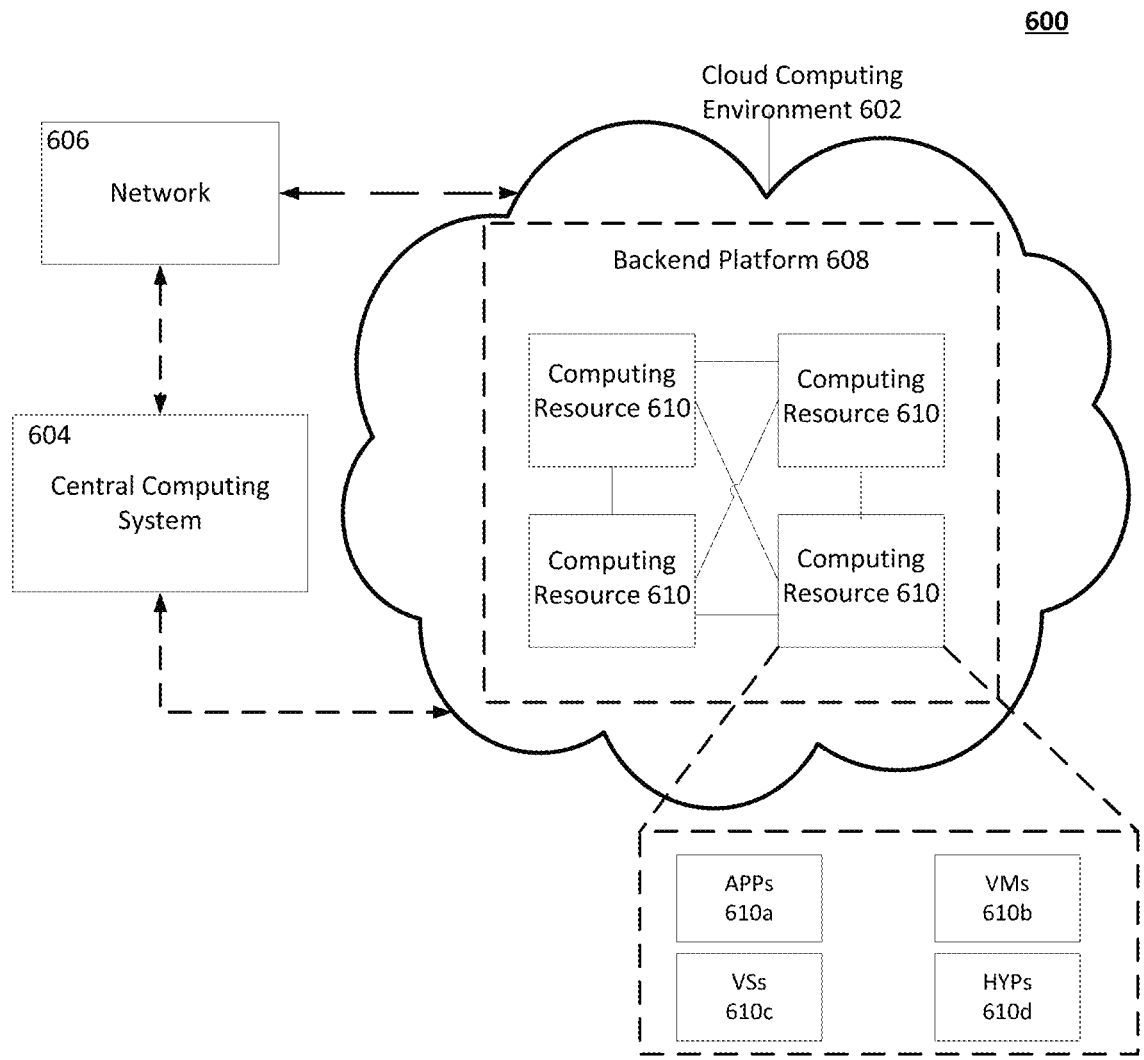
FIG. 6 is a block diagram of an example where a cloud computing environment may be accessed by a user module, according to some embodiments.

As shown in FIG. 6, cloud computing environment 602 may contain backend platform 608, in a block diagram of an example cloud environment 600 in which systems and/or methods described herein may be implemented. The central module 406 of FIG. 4, described above, may also include a host such as cloud computing environment 602 in an embodiment. The cloud computing environment 602 may be accessed by the central computing system 604, of the same type of computing system 700 as described above. In this case, the central computing system 604 of FIG. 5 may access the cloud computing environment 602 by a communication or network interface 724 as shown in FIG. 7, wherein a network gateway 606 may comprise a remote entity 728 accessed by the communications path 726 of the central module computing system (where the three entities 602, 604, and 606 shown in FIG. 6 would collectively correspond to the central module 406 of FIG. 4). Alternately, the computing cloud environment 602 itself may correspond to a remote entity 728 in FIG. 7, and may be accessed directly by the central computing system 604 through a communications path 726, for example through an application protocol interface (API), eliminating the need for a network gateway 606 (both options are shown in FIG. 6, wherein the flow path above the central module computing system 604 uses a network gateway 606, and the flow path below the user computing system 604 connects directly to the cloud computing environment 602, both shown using dashed bi-directional lines).

The devices of the environments 600 and 400 may be connected through wired connections, wireless connections, or a combination of wired and wireless connections. In an example embodiment, one or more portions of the data transfer environment 400 or example cloud environment 600 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

As explained above, the central module 406 of FIG. 4 may have a central computing system 604 as shown in FIG. 6 comprising a computer system of the same type as the computer system 700 as shown in FIG. 7. The user module 404 may access the central module 406 through the central computing system 604, wherein the user module 404 may be an external network entity 728 from the perspective of the central computing system 604 in an embodiment. The user module 404 may send data back and forth in the form of data packets through the communications path 726 of the communications interface 724 of system 604, using e.g., TCP/IP/UDP/FTP/HTTPS/HTML5 protocol. Alternately, the user module 404 may access the central module 406 through a front-end application 610a (e.g. a web browser application, a web integrated development platform (IDE), a web browser extension, proprietary OS application, standalone executable application, command line access shell program, FTP/UDP/TCP/HTML5 protocol, etc.) hosted as an application 610a on a computing resource 610 (explained infra) within the cloud computing environment 602 hosted by the central module 406, in an embodiment.

The backend platform 608 in FIG. 6 may include a server or a group of servers. In an embodiment, the backend platform 608 may host a cloud computing environment 602. It may be appreciated that the backend platform 608 may not be cloud-based, or may be partially cloud-based.

The cloud computing environment 602 includes an environment that delivers computing as a service and software as a service ("CaaS" and "SaaS" as described above), whereby shared resources, services, etc. may be provided to the user computing system 604 and/or the backend platform 608. The cloud computing environment 602 may provide computation, software, data access, storage, and/or other services that do not require end-user knowledge of a physical location and configuration of a system and/or a device that delivers the services. For example, through a cloud environment 600 included as part of the central module 406, the user module 404 may receive data stored within or hosted on a database within computing resources 610 within the back-end platform 608, through an application protocol interface (API) or any of the various communication protocols previously listed, or through a web-based application 610a, which will be described infra.

The cloud computing environment 602 may include computing resources 610. Each computing resource 610 includes one or more personal computers, workstations, computers, server devices, or other types of computation and/or communication devices of the type such as computer system 700 described above. The computing resource(s) 610 may host the backend platform 608. The cloud computing resources may include compute instances executing in the cloud computing resources 610. The cloud computing resources 610 may communicate with other cloud computing resources 610 via wired connections, wireless connections, or a combination of wired or wireless connections.

Computing resources 610 may include a group of cloud resources, such as one or more applications ("APPs") 610a, one or more virtual machines ("VMs") 610b, virtualized storage ("VS") 610c, and one or more hypervisors ("HYPs") 610d.

An application 610a may include one or more software applications or programs that may be provided to or accessed by a computer system 700, such as web-based applications, web-based executables, web-based IDEs, etc. In an embodiment, the central module 406 may include a cloud computing environment 602 executing locally on a computer system 700 of the central computing system 604. The application 610*a* may include software associated with backend platform 608 and/or any other software configured to be provided across the cloud computing environment 602 (e.g. to user module 404). The application 610*a* may send/receive information from one or more other applications 610*a*, via one or more of the virtual machines 610*b*. Computing resources 610 may be able to access each other's applications 610*a* through virtual machines 610*b*, in this manner. In an alternate embodiment, a separate user computing system 604 is not needed, and the central module 406 only comprises the cloud computing environment 602, hosted and executed by computing resources 610, and communicating with the user module 404 via app 610*a*, using any of the various communication protocols mentioned above.

Virtual machine 610*b* may include a software implementation of a machine (e.g., a computer) that executes programs like a physical machine. This may be of particular use in the alternate embodiment where there is no separate user computing system 604 of the type of computer system 700. In this embodiment, the user computing system 604 may be a virtualized machine 610*b*, and may communicate with user module 404 using the various communication protocols listed above, via an application 610*a*. Virtual machine 610*b* may be either a system virtual machine or a process virtual machine. A system virtual machine may provide a complete system platform that supports execution of a complete operating system (OS). A process virtual machine may execute a single program and may support a single process. The virtual machine 610*b* may execute on behalf of a user (e.g., the administrator of the central module 406) and/or on behalf of one or more other backend platforms 608, and may manage infrastructure of cloud computing environment 602, such as data management, synchronization, or long duration data transfers, and accessing the central repository 406*a*.

Virtualized storage 610*c* may include one or more storage systems and/or one or more devices that use virtualization techniques within the storage systems or devices of computing resource 610. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the central module 406 flexibility in how they manage storage for data from processing of data accessed from the central repository 406*a*. File virtualization may eliminate dependencies between data accessed at a file level and location where files are physically stored. This manner of block and file virtualization may enable optimization of storage use, server consolidation, and/or performance of non-disruptive file migrations.

Hypervisor 610*d* may provide hardware virtualization techniques that allow multiple operations systems (e.g., "guest operating systems") to execute concurrently on a host computer, such as computing resource 610, which may include a computing system of the type of computing system 700, and can in this manner host a virtualized hardware of a user computing system 604. Hypervisor 610*d* may present a virtual operating platform to the guest operating systems, and may manage multiple instances of a variety of operating systems as these "guest operating systems," which may share virtualized hardware resource, such as RAM, which may for instance access the data in the form of a database of the central repository (406*a* in FIG. 4). Alternately, secondary memory may be accessed using virtualized storage 610*c*, or on physical storage, such as the hard disk drive 712, of a computing resource 610 of the type of computing system as computing system 700. In embodiments heretofore described, using a combination of RAM and secondary memory to access the database, such that a portion of the database may be in-memory and a portion of the database stored in files It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for performing authentication of a user, comprising:

receiving, by at least one processor, sensor feedback generated from a motion sensor of a virtual reality user device;

analyzing the sensor feedback at predetermined time intervals to determine a coordinate position in three dimensional space, and determining a directional vector in a direction in which the virtual reality user device is tilted or pointing, corresponding to movement of a user using the virtual reality user device;

displaying a plurality of objects floating in a randomized manner in a virtual program display;

starting a locking process where once the user orients the virtual reality device a predetermined three-dimensional distance from an object, that object is selected and displayed with a designation of being selected, wherein the virtual program display is unconfined in an x-y plane, and is confined to a field of view relative to the user using the virtual reality user device in an x-z plane and an y-z plane at a pre-determined angle from 0 to 60 degrees in both the x-z and y-z planes.

2. The method of claim 1, further comprising:

displaying the directional vector in which the virtual reality user device is pointing on the virtual program display;

determining a selected object as truly selected when it is continuously selected for a predetermined period of time; and determining a password to be successfully inputted if a particular number of the plurality of objects are truly selected in a particular chronological order.

3. The method of claim 1, wherein the motion sensor is at least one of a gyroscope, accelerometer, or magnetometer.

4. The method of claim 2, wherein the sensor feedback includes measurements of acceleration in the x, y, and z directions, as well as roll, pitch, and yaw measurements.

5. The method of claim 2, further comprising:

determining, via a Bayesian learning model classifier, whether the movement of the user using the virtual, mixed, or augmented reality user device conforms to a movement pattern associated with a human, or a computer and not a human.

6. The method of claim 4, further comprising:

upon determining that movement of the user conforms to a movement pattern associated with a computer and not a human, either locking the virtual, mixed, or augmented reality user device, logging the user out of a user session, or displaying a message on the virtual program display to warn the user a computer and not a human seems to be controlling the virtual, mixed, or augmented reality user device.

7. A system, comprising:

a virtual reality user device including a motion sensor;
a virtual program display device;
a memory; and
at least one processor coupled to the memory and configured to:

receive sensor feedback from the at least one of the gyroscope, accelerometer, or magnetometer included on the virtual, mixed, or augmented reality user device;

analyze the sensor feedback at predetermined time intervals to determine a coordinate position in three-dimensional space, and determine a directional vector in a direction in which the virtual reality user device is tilted or pointing, corresponding to movement of a user using the virtual reality user device;

display a plurality of objects floating in a randomized manner in a virtual program display of the virtual program display device;

start a locking process where once the user orients the virtual reality user device a predetermined three-dimensional distance from an object, that object is selected and displayed with a designation of being selected, wherein the virtual program display is unconfined in an x-y plane, and is confined to a field of view relative to the user using the virtual reality user device in an x-z plane and an y-z plane at a pre-determined angle from 0 to 60 degrees in both the x-z and y-z planes.

8. The system of claim 7, wherein the at least one processor is further configured to:

display the directional vector in which the virtual reality user device is pointing within the virtual program display;

determine a selected object as truly selected when it is continuously selected for a predetermined period of time; and determine a password to be successfully inputted if a particular number of the plurality of objects are truly selected in a particular chronological order.

9. The system of claim 8, wherein the sensor feedback from the virtual, mixed, or augmented reality user device includes measurements of acceleration in the x, y, and z directions, as well as roll, pitch, and yaw measurements.

10. The system of claim 7, wherein the virtual reality device is a mixed reality device, and wherein the plurality of objects displayed includes a delete object, wherein when the delete object is truly selected after a first object is truly selected, the first object is unselected and is not considered as part of the sequence of truly selected objects comprising the input of a password.

11. A non-transitory computer-readable device having instructions stored thereon that, when executed by at least one computing device, causes the at least one computing device to perform operations comprising:

receiving sensor feedback generated from a motion sensor of a virtual reality user device;

analyzing the sensor feedback at predetermined time intervals to determine a coordinate position in three-dimensional space, and determining a directional vector in a direction in which the virtual reality user device is tilted or pointing, corresponding to movement of a user using the virtual reality user device;

displaying a plurality of objects floating in a randomized manner in a virtual program display;

starting a locking process where once the user orients the virtual reality user device a predetermined three-dimensional distance from an object, that object is selected and displayed with a designation of being selected, wherein the virtual program display is unconfined in an x-y plane, and is confined to a field of view relative to the user using the virtual reality user device in an x-z plane and an y-z plane at a pre-determined angle from 0 to 60 degrees in both the x-z and y-z planes.

12. The device of claim 11, wherein the operations further comprise:

displaying a directional vector in which the virtual reality user device is pointing on the virtual program display;

determining a selected object as truly selected when it is continuously selected for a predetermined period of time; and determining a password to be successfully inputted if a particular number of the plurality of objects are truly selected in a particular chronological order.

13. The device of claim 11, wherein the sensor feedback includes measurements of acceleration in the x, y, and z directions, as well as roll, pitch, and yaw measurements.

14. The device of claim 11, wherein the operations further comprise:
determining, via a Bayesian learning model classifier, whether the movement of the user using the virtual, mixed, or augmented reality user device conforms to a movement pattern associated with a human, or a computer and not a human.

15. The device of claim 14, further comprising:
upon determining that movement of the user conforms to a movement pattern associated with a computer and not a human, either locking the virtual, mixed, or augmented reality user device, logging the user out of a user session, or displaying a message on the virtual program display to warn the user a computer and not a human seems to be controlling the virtual reality user device.

16. The device of claim 12, further comprising:
displaying a prompt to the user to input a password, before sensory feedback is received;
wherein one of the plurality of objects displayed is a finish object;
wherein when the finish object is truly selected, designating all previous truly selected objects from the time the prompt is displayed until the true selection of the finish object, in chronological order not including the finish object, as an inputted password.

17. The device of claim 12, further comprising:
displaying a new password prompt to the user before sensory feedback is received, wherein the prompt indicates to the user that a password must be inputted twice;
wherein one of the plurality of objects displayed is a finish object;
wherein when the finish object is truly selected a first time, designating all previous truly selected objects from the time the prompt is displayed until the true selection of the finish object, in chronological order not including the finish object, as a first password;
wherein when the finish object is truly selected a second time, designating all previous truly selected objects from the time immediately after the first password is designated until the true selection of the finish object a second time, in chronological order not including the finish object, as a second password; and
checking to see if the first password matches the second password, and if it does, displaying a message of success to the user.

* * * * *